Patented June 25, 1940

2,205,448

UNITED STATES PATENT OFFICE 2,205,448

ISOMER OF CHOLESTEROL AND PROCESS FOR PRODUCING THE SAME

Everett S. Wallis, Princeton, and Erhard Fernholz, Elizabeth, N. J., assignors to Merck & Co. Inc., Rahway, N. J., a corporation of New Jersey No Drawing. Application January 16, 1937, Serial No. 120,880

7 Claims. (Cl. 260—397)

This invention relates to new compounds called i-cholesteryl acetate and i-cholesterol, ("i" indicating isomer) and to processes for their production.

These new compounds were prepared by us during the course of our investigations of new processes for the preparation of the epimeric modifications of certain unsaturated sterols.

The epimerization of the hydroxyl group of cholesterol, and other unsaturated sterols, has assumed considerable importance since Ruzicka et al. [Helv. Chim. Acta. 17 1395 (1934)] reported their findings to the effect that the male hormone, androsterone, is a derivative of epi-dihydrocholesterol, and that its physiological activity is much greater than that of the corresponding epimer, iso-androsterone, obtained from β-cholestanol.

Our method of approach to the preparation of epi-cholesterol, was based upon certain experiments reported by Phillips (J. Chem. Soc. 123 44 (1925)), carried out on alcohols containing only one asymmetric carbon atom, and it involved an investigation of the action of potassium acetate on cholesteryl-p-toluene sulfonate. However, in order to avoid the complication of the formation of ethers, and since we had observed that, in acetic acid solution, the normal cholesteryl acetate is formed, our reaction was carried out with anhydrous potassium acetate in acetic anhydride solution. Very unexpectedly, a new, hitherto unknown, acetate was thus obtained, which is isomeric with cholesteryl acetate, and which we call i-cholesteryl acetate.

This new compound is strongly dextro-rotatory, $$[\alpha]_D^{20} = +47.8$$

and melts at about 73° C. On hydrolysis, it yields i-cholesterol. It crystallizes from alcohol in long needles which melt at room temperature. The substance resolidifies and passes into another crystalline form which melts at 74-75° C. The hydrolysis product, i-cholesterol, is also strongly dextro-rotatory $$[\alpha]_D^{20} = +23.9$$

It is not precipitated by digitonin. Reacetylation yields the above i-cholesteryl acetate.

Hydrogenation of the new acetate is most satisfactorily accomplished by reacting upon it with the Adams platinum oxide catalyst. When this platinum oxide is reduced in the presence of the i-cholesteryl acetate, rapid hydrogenation takes place and dihydrocholesteryl acetate is formed in good yield. Palladium black was found to be ineffective for this purpose, while only a very slow reaction is obtained with platinum black.

Our new acetate, i-cholesteryl acetate, does not react with perbenzoic acid. It does not decolorize readily a solution of bromine in carbon tetrachloride. The Liebermann reaction is quite strong. This inertness toward bromine and perbenzoic acid, and its relative stability toward catalytic hydrogenation suggest that a double bond, as such, is not present in i-cholesteryl acetate and i-cholesterol.

We have found that i-cholesterol may be easily oxidized with chromic acid in acetic acid solution. From the products formed, an oxime has been isolated, in 20% yield. This indicates that i-cholesterol is a secondary alcohol.

Preparation of i-cholesteryl acetate

About 100 gms. of anhydrous potassium acetate are dissolved in 1500 cc. of boiling pure acetic anhydride. The solution is cooled to 50° C. whereupon potassium acetate crystallizes in a finely divided state. About 35 gms. of cholesteryl-p-toluene sulfonate are added. The flask is then placed on the steam bath, and stirred for approximately 36 hours, during which time the temperature inside the flask is varied from 70 to 80° C.

The dark brown mixture is poured into cold water; 800 cc. of ether are added, and the ether layer is washed repeatedly with a cold aqueous solution of potassium carbonate. The acetic anhydride also may be removed by distillation under diminished pressure. After complete removal of the acetic anhydride and acetic acid, the ether layer is dried with anhydrous sodium sulfate, decolorized with animal charcoal and the ether removed by distillation. An oily product is obtained. This material is dissolved in alcohol, and small amounts of ether are added. Crystallization may be carried out in such a manner as to obtain four crops of crystals:

1st crop wt. 3.6 gms. M. P. 71.5° C.
2nd crop wt. 0.5 gm. M. P. 70-71° C.
3rd crop wt. 4.7 gms. M. P. 64-66° C.
4th crop wt. 7.2 gms. M. P. 59-62° C.

Several recrystallizations of the 3rd and 4th fractions give 0.4 gm. of material having a melting point of 71° C. and 7.5 gms. of a material melting at 67-68° C.

The i-cholesteryl acetate may be freed from cholesteryl acetate which occurs with it in the following manner:

About 7½ gms. of i-cholesteryl acetate (M. P. 67-68° C.) are dissolved in 100 cc. of alcohol, and treated with 8 gms. of potassium hydroxide. The solution is refluxed for one-half hour on the water bath, then poured into water and extracted with ether. The dried ether solution is evaporated to dryness and taken up in a small amount of 90% alcohol. A solution of 6 gms. of digitonin in 500 cc. of 90% alcohol is then added. The contents are allowed to stand until they reach room temperature. The digitonide is filtered and dried.

The filtrate is evaporated to dryness and digested with ether. The ether solution is distilled and the residue is dissolved in alcohol. On cooling in an ice-salt mixture, i-cholesterol crystallizes. The crystals are filtered rapidly, and placed in a vacuum desiccator. They melt and resolidify. Weight of product, 3.5 gms.; melting point, 74-75° C.

About 22.6 mg. of this material dissolved in 2 cc. of chloroform solution gave $\alpha_D^{20} = +0.27$ (100 mm. tube)

$$[\alpha]_D^{20} = +23.9$$

About 1.5 gms. of i-cholesterol is heated with 10 cc. of acetic anhydride for about one hour on the water bath. On cooling, a crystalline product separates. Recrystallization from alcohol gives an acetate which melts at 73° C.

About 25.1 mg. in 2 cc. chloroform solution gave $\alpha_D = +0.6°$.

$$[\alpha]_D^{20} = +47.8$$

*Oxidation of i-cholesterol with chromic acid*

About ninety-three hundredths of a gram of i-cholesterol is dissolved in 30 cc. of specially purified acetic acid ($KMNO_4$ method). A solution of 0.64 gm. of chromic acid in 20 cc. of acetic acid is added drop-by-drop. The solution becomes temporarily cloudy, and the temperature rises slightly. The mixture is kept at room temperature for about 12 hours, and is then extracted with ether. The ether is shaken with an aqueous solution of 2N sodium hydroxide to remove acidic material. This acidic material cannot be crystallized. The neutral part crystallizes as i-cholesterone. It forms an oxime.

*Preparation of the oxime*

About thirty-three hundredths of a gram of the crude ketone, i-cholesterone, described above, is boiled for two hours with 0.3 gm. of hydroxylamine hydrochloride and 0.5 gm. of sodium acetate in 30 cc. of ethyl alcohol. The solution is diluted with water, and the finely divided white material is filtered. Recrystallization from dilute alcohol gives i-cholesterone oxime in the form of small leaflets which, when thoroughly dry melt at 143-144° C.

The new compounds have the structural formula

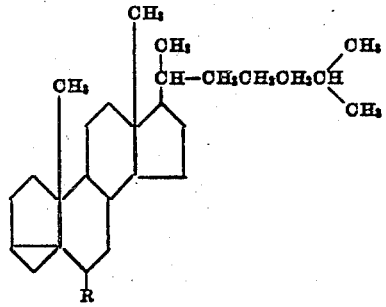

where R may be selected from the group consisting of an acetate radical, hydroxyl, oxygen, and the oxime radical.

We claim as our invention:

1. The product of reaction between cholesteryl-p-toluene sulfonate and anhydrous potassium acetate in acetic anhydride.

2. The hydrolysis product of the product covered by claim 1.

3. The process for the production of i-cholesteryl acetate having the following formula:

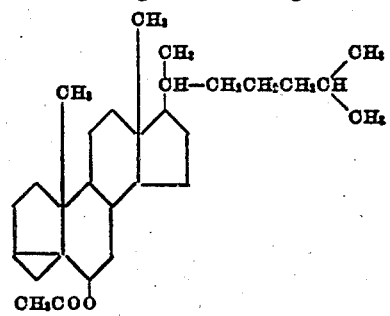

which comprises reacting upon anhydrous potassium acetate in acetic anhydride with cholesteryl-p-toluene sulfonate.

4. The process for the production of i-cholesterol having the following formula:

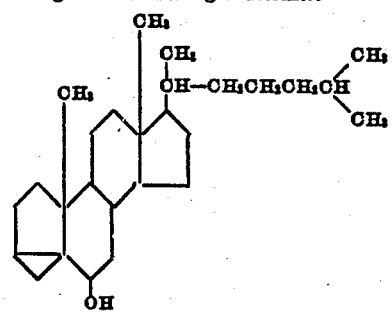

which comprises reacting upon anhydrous potassium acetate in acetic anhydride with cholesteryl-p-toluene sulfonate, and hydrolyzing the i-cholesteryl acetate thus produced to obtain i-cholesterol.

5. A product of the formula

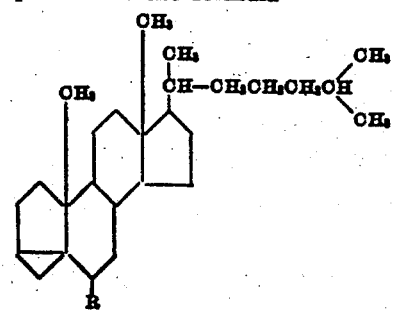

where R may be selected from the group consisting of an acetate radical, hydroxyl, oxygen, and the oxime radical.
6. i-Cholesteryl acetate of the following formula:
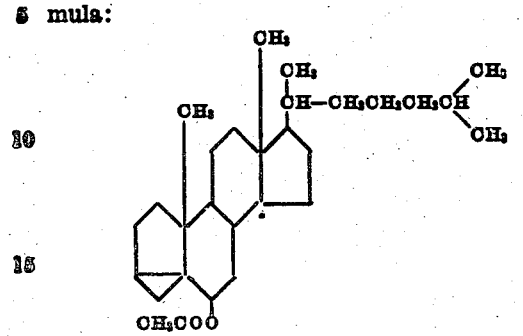
7. i-Cholesterol of the following formula:
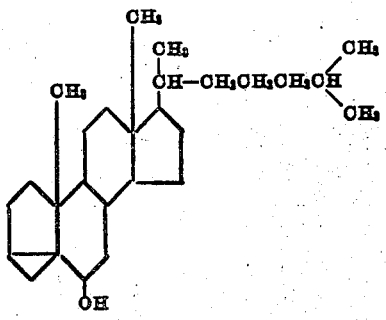
EVERETT S. WALLIS.
ERHARD FERNHOLZ.